United States Patent
Szabo et al.

(10) Patent No.: US 12,459,127 B2
(45) Date of Patent: Nov. 4, 2025

(54) METHODS AND ARRANGEMENTS FOR CONTROLLING A ROBOT DEVICE OVER A WIRELESS NETWORK

(71) Applicant: Telefonaktiebolaget LM Ericsson (publ), Stockholm (SE)

(72) Inventors: Geza Szabo, Kecskemet (HU); Attila Báder, Paty (HU); Bence Formanek, Budapest (HU); Sándor Rácz, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 982 days.

(21) Appl. No.: 16/980,482

(22) PCT Filed: Jun. 19, 2018

(86) PCT No.: PCT/EP2018/066280
§ 371 (c)(1),
(2) Date: Sep. 14, 2020

(87) PCT Pub. No.: WO2019/242846
PCT Pub. Date: Dec. 26, 2019

(65) Prior Publication Data
US 2021/0023712 A1    Jan. 28, 2021

(51) Int. Cl.
*B25J 9/16*     (2006.01)
*B25J 13/08*    (2006.01)
(Continued)

(52) U.S. Cl.
CPC ............ *B25J 9/1689* (2013.01); *B25J 13/08* (2013.01); *G06V 20/10* (2022.01); *G06V 20/46* (2022.01);
(Continued)

(58) Field of Classification Search
CPC ........ B25J 9/1689; B25J 13/08; B25J 9/1697; G06V 20/46; G06V 20/10; G08C 17/02; H04N 7/147
See application file for complete search history.

(56) References Cited

U.S. PATENT DOCUMENTS 7,330,875 B1    2/2008  Parasnis et al.
8,718,822 B1    5/2014  Hickman et al.
(Continued)

FOREIGN PATENT DOCUMENTS

| CN | 105116785 A | * | 12/2015 | ........... G05B 19/042 |
| CN | 106444458 A | * | 2/2017  | ............ G05B 19/04 |
| WO | WO-2012167927 A1 | * | 12/2012 | ........... H04N 19/117 |

OTHER PUBLICATIONS

"Bouabdallah, Ahmed; Wehbe, Houssein; Stevant, Bruno; Uplink Transfer of Live Video Synchronized with Multiple Contextual Data; Oct. 2012; Media Synchronization Workshop 2012, Oct. 2012, Berlin, Germany" (Year: 2012).*
(Continued)

*Primary Examiner* — Ramya P Burgess
*Assistant Examiner* — Christopher R Cardimino
(74) *Attorney, Agent, or Firm* — Sage Patent Group (57) ABSTRACT

Methods and arrangements for controlling a robot device (202) by a control device (206) over a radio communication network using a video session are disclosed. Control commands from the control device are embedded (S226) into a down-stream video stream and delivered over the communication network (210) after which the control commands are extracted (S212) from down-stream video stream and provided to the robot device. Sensor data from the robot device, based on the control commands, are embedded (S218) in an up-stream video stream and delivered over the communication network, after which the sensor data is extracted (S220) from the up-stream video stream and
(Continued)

provided to the control device. The control device may then determine updated control commands based on the provided sensor data. The quality of service used in the video session over the communication network is herein suitable for controlling the robot device by the control device.

18 Claims, 3 Drawing Sheets

(51) Int. Cl.
  *G06V 20/10*    (2022.01)
  *G06V 20/40*    (2022.01)
  *G08C 17/02*    (2006.01)
  *H04N 7/14*    (2006.01)

(52) U.S. Cl.
  CPC ............ *G08C 17/02* (2013.01); *H04N 7/147* (2013.01); *B25J 9/1697* (2013.01)

(56) References Cited

U.S. PATENT DOCUMENTS

| | | | |
|---|---|---|---|
| 8,798,791 B2 | 8/2014 | Li et al. | |
| 9,031,692 B2 | 5/2015 | Zhu | |
| 9,479,732 B1* | 10/2016 | Saleh | H04N 7/142 |
| 10,029,370 B2* | 7/2018 | Sutherland | B25J 11/009 |
| 10,321,096 B2* | 6/2019 | Morabia | H04L 65/1093 |
| 10,532,463 B2* | 1/2020 | Wang | G16H 40/63 |
| 10,574,830 B2* | 2/2020 | Rajendran | H04L 69/24 |
| 11,202,079 B2* | 12/2021 | Xu | H04N 19/523 |
| 11,245,939 B2* | 2/2022 | Saxena | H04N 21/816 |
| 2008/0015427 A1* | 1/2008 | Kastelein | A61B 90/36 |
| | | | 600/410 |
| 2009/0135919 A1* | 5/2009 | Vered | H04N 21/8106 |
| | | | 375/E7.193 |
| 2012/0063508 A1* | 3/2012 | Hattori | H04N 21/4351 |
| | | | 375/E7.026 |
| 2014/0016707 A1* | 1/2014 | Wang | H04N 19/31 |
| | | | 375/240.26 |
| 2014/0071976 A1 | 3/2014 | Anand et al. | |
| 2014/0253601 A1* | 9/2014 | Ma | G09G 3/2096 |
| | | | 345/690 |
| 2015/0338204 A1 | 11/2015 | Richert et al. | |
| 2019/0354774 A1* | 11/2019 | Leizerovich | G06V 20/62 |

OTHER PUBLICATIONS

"Hannuksela, Miska; Yan, Ye; Huang, Xuehui; Li Houqiang; Overview of the Multiview High Efficiency Video Coding (MV-HEVC) Standard; 2015; Nokia Technologies, University of Science and Technology of China" (Year: 2015).*

European Office Action for European Patent Application No. 18734157.3 mailed May 9, 2022, 5 pages.

PCT International Search Report and Written Opinion mailed Aug. 10, 2018 for International Application PCT/EP2018/066280, 10 pages.

Wang et al., "RTP Payload Format for H.264 Video", Internet Engineering Task Force, Request for Comments: 6184, May 2011, 101 pages.

Information Technology—"Coding of Audio-Visual Objects"—Part 10: Advanced Video Coding, International Standard, ISO/IEC 14496-10, Second edition, Oct. 1, 2004, 280 pages.

* cited by examiner

METHODS AND ARRANGEMENTS FOR CONTROLLING A ROBOT DEVICE OVER A WIRELESS NETWORK

CROSS-REFERENCE TO RELATED APPLICATIONS

This application is a 35 U.S.C. § 371 national stage application for International Application No. PCT/EP2018/066280, entitled "METHODS AND ARRANGEMENTS FOR CONTROLLING A ROBOT DEVICE OVER A WIRELESS NETWORK", filed on Jun. 19, 2018, the disclosures and contents of which are hereby incorporated by reference in their entireties.

TECHNICAL FIELD

This disclosure relates to control of a robot device. In more particular, it relates to methods and arrangements for controlling the robot device over a radio communication network.

BACKGROUND

In fourth generation mobile communication (4G) and fifth generation mobile communication (5G) systems, dedicated channels are provided for different services such as voice, mobile broadband video, file transfer, video telephony, and connectivity to different cloud services. These differing services typically carry different traffic types, and consequently may have differing quality of service requirements. Radio scheduling and transport configuration of mobile communication networks ensures a level of quality of service and delivering the differing services in the network end-to-end.

Moreover, moving robotics and automation algorithms into the cloud requires frameworks that facilitate such a transition. The cloud provides three possible levels at which a framework could be implemented. The lowest level is Infrastructure as a Service (IaaS), where bare operating systems are provided on machines, which can be virtualized, in the cloud. The second level, Platform as a Service (PaaS), provides more structure, including application frameworks and database access, while restricting the choice of programming languages, system architectures, and database models, which can be used. Software as a Service (SaaS), the third level is the highest level of structure of which there is a demand these days.

A current focus of cloud based robotics is to speed up the processing of input data collected from many sensors with big data computation. Another approach is to collect various knowledge bases in centralized locations e.g., possible grasping poses of various three-dimensional (3D) objects.

Current industrial robot deployments consist of a robotic arm and a controller thereof localized very close to it. The controller typically has predefined commands, which have to be executed. The controller and the arm are typically connected via proprietary industrial protocols.

Controlling robot devices in the cloud over a wireless communication network is currently out of the scope of the robotics industry, at least partly due to lack of wireless links with trustworthy and low delays and strategic decisions.

Today cloud robotics exists mostly following the PaaS approach. However, with the help of $5^{th}$ generation wireless systems (5G), the PaaS approach may be extended to use the SaaS paradigm offering many potential advantages for robots and automation systems.

With SaaS, an interface allows data to be sent to a server that processes the data as input and returns output, which relieves users of the burden of maintaining data, software and hardware, and also allows companies to control proprietary software. This approach is called this Robotics and Automation as a Service (RAaaS).

From the document U.S. Pat. No. 9,031,692 B2 it is known a cloud robot system and a method for integrating the same. In U.S. Pat. No. 9,031,692 B2 the cloud can be used to expand computing ability and storage capacity of a robot.

Patent document U.S. Pat. No. 8,798,791 B2 teaches a robot control system and a robot control method. This document relates to moving a robot control in the cloud to a point that is closest to the robot that the user wishes to control.

In a potential 5G controlled robotics use case, a robot control would be deployed in the cloud and the robot would be connected to the controller via regular transport protocols, for example, User datagram protocol (UDP)/Transmission control protocol (TCP).

Messages carrying robot status and robot command information typically consume a relatively low network bandwidth, for instance, ca. 1 Mega-bit per second (Mbps).

Network latency will have to be considered. Also, the robustness of the channel being used to transfer command and status information has to be considered. Both command information and status information are needed to achieve a smooth robot control.

Said channel may well use wireless connection due to the ease of deployment and/or due to the fact that the robotic device may be on a mobile platform or even on a drone. In these cases, wireless channel options may have certain cost to operate on, for example long term evolution (LTE) versus Wi-Fi, in return of their robustness.

There is a demand for an alternative technique with which a wireless connection can be successfully used in the control of robot devices.

SUMMARY

It is an object of embodiments of the disclosure to address at least some of the issues outlined above, and this object and others are solved by a robot device, a control device, methods performed therein, a computer program and a computer-readable storage medium for controlling the robot device over a radio communication network.

According to an aspect, the present disclosure provides a method of controlling a robot device within a two-way video session between the robot device and a control device over a mobile radio communication network. The method is implemented in the control device. The method comprises extracting sensor data of the robot device, from an up-stream video stream of said two-way video session. The method also comprises providing the sensor data within the control device. Also, the method comprises obtaining control commands for controlling the robot device, based on the provided sensor data. In addition, the method comprises embedding the control commands in a down-stream video stream of said two-way video session.

According to another aspect, the disclosure provides a method of controlling a robot device within a two-way video session between the robot device and a control device over a mobile radio communication network. The method is implemented in the robot device. The method comprises extracting control commands of the control device from a down-stream video stream of said two-way video session. Also, this method comprises applying the control commands within the robot device. The method also comprises obtaining sensor data from sensors of the robot device based on the control commands. In addition, the method comprises embedding the sensor data in an up-stream video stream of said two-way video session.

According to another aspect, the disclosure provides a control device that is configured to control a robot device and that is adapted to participate in a two-way video session with the robot device over a mobile radio communication network. The control device comprises a processor circuit, and a memory that has instructions executable by the processor circuit. When executing said instructions, the processor circuit is configured to extract sensor data of the robot device from an up-stream video stream of said two-way video session. When executing said instructions, the processor circuit is also configured to provide the sensor data within the control device. Also, when executing said instructions, the processor circuit is configured to obtain control commands for controlling the robot device, based on the provided sensor data. In addition, when executing said instructions, the processor circuit is configured to embed the control commands in a down-stream video stream of said two-way video session.

According to yet another aspect, the disclosure provides a robot device that is configured to be controlled by a control device within a two-way video session with the control device over a mobile radio communication network. The robot device comprises a processor circuit and a memory that has instructions executable by the processor circuit. When executing said instructions said processor circuit is configured to extract control commands from a down-stream video stream of said two-way video session. Also, when executing said instructions said processor circuit is configured to apply the control commands within the robot device. Also, when executing said instructions said processor circuit is configured to obtain sensor data from sensors of the robot device, based on the control commands. In addition, when executing said instructions said processor circuit is configured to embed the sensor data in an up-stream video stream of said two-way video session.

According to yet another aspect, the disclosure provides a computer program that is adapted for controlling a robot device within a two-way video session between the robot device and a control device over a mobile radio communication network. The computer program comprising instructions which, when executed on at least one processor, cause the at least one processor to carry out the method claims.

According to still yet another aspect, the disclosure provides a computer-readable storage medium, having thereon said computer program.

One or more of the following advantages are provided by embodiments of the present disclosure.

It is an advantage that encodings, such as H.264 encoding, and ViLTE is an already introduced service with dedicated QoS bearer in the mobile networks for real time communication. For this reason the H.264 encoding can provide the relatively high QoS for robot control. It is a further advantage that there is no need to modify or handle specially anything in such currently deployed systems.

The present disclosure increases reliability of control of a robot device by using differentiation of control commands.

Further, as a consequence of reliability and redundancy provided by the higher QoS of the video session, retransmission of lost or damaged control commands can be avoided, which makes the control of robot devices extremely fast, truly real-time.

It is also an advantage that the up-stream video stream can be used to transmit video information on the current status of a remote robot device. It is a further advantage that the down-stream video stream can be used to transmit a graphical model of the predicted movements of the robot device.

BRIEF DESCRIPTION OF THE DRAWINGS

Embodiments will now be described in more detail, and with reference to the accompanying drawings, in which.

DETAILED DESCRIPTION

In the following description, different embodiments of the disclosure will be described in more detail, with reference to accompanying drawings. For the purpose of explanation and not limitation, specific details are set forth, such as particular examples and techniques in order to provide a thorough understanding.

As mentioned above, prior art techniques often focus on general aspects of industrial protocols when being carried over wireless connections.

It is mentioned that controlling of robot devices from the cloud is still a challenge due to robustness and latency requirements.

It would be advantageous with a technique with which wireless connection, over a radio communication network, can be successfully used with an existing channel for the control of robot devices.

It is herein proposed to use an existing network solution for providing scalable robot control from the cloud. More particularly, it is proposed to use a video streaming architecture in a two-way video session between a robot device and a robot controller. It has been realized that 4G, 5G or NR mobile communication systems offer a QoS that is adequate for robot control over the cloud. In order words, the QoS provided using such mobile communication systems fulfils robot control QoS requirements in terms of latency and robustness. For instance, video over long term evolution (ViLTE) is advantageously used. Moreover, efficient video coding, such as H.264, is preferably used.

It is noted that robot control over the cloud may utilize calculation of positions or velocities of the robot device, via which a robot device trajectory may be determined.

Figure 1:
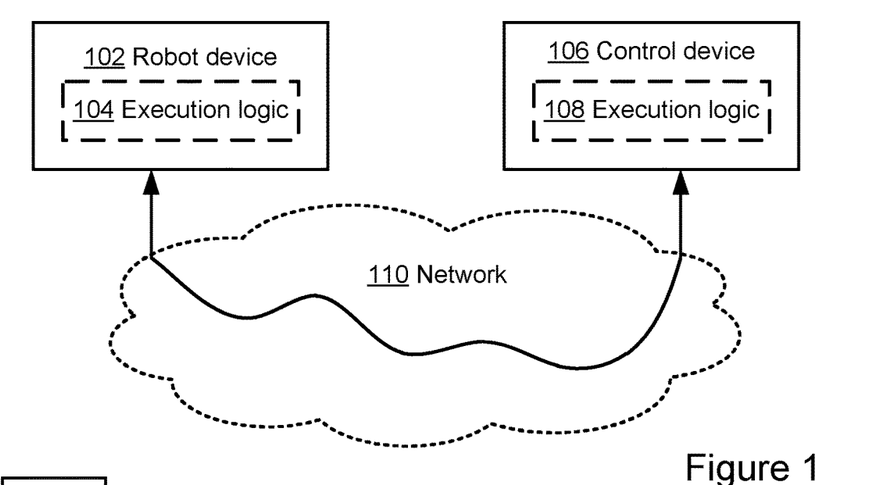
FIG. 1 schematically illustrates a generic architecture that is related to embodiments of the present disclosure.

FIG. 1 schematically illustrates a generic architecture that is related to embodiments of the present disclosure. The generic architecture comprises a robot device 102, and a control device 106 in two-way video session with each other over a radio communication network 110. In one example the robot device 102 comprises execution logic 104, whereas the control device comprises execution logic 108. The radio communication network 110 may comprise a fourth generation (4G) mobile communication network, a fifth generation (5G) mobile communication network or a new radio (NR) mobile communication network.

The execution logic 104 and/or execution logic 108 may be executed over the cloud and communication between a control device and the robot device may occur on a regular basis, i.e. in an isochronous way, typically with a frequency of 20-200 Hz. For this purpose, the robot device may send sensor data to a control device, whereas the control device sends control commands to the robot device. In a further embodiment, the robot device may also send encoded video data to the control device controlling the robot device. In addition, the control device may also send video data to the robot device, to further enhance the control of the robot device. Control commands from the robot control to the robot device may comprise movement commands, in the form of velocity or position commands.

Figure 2:
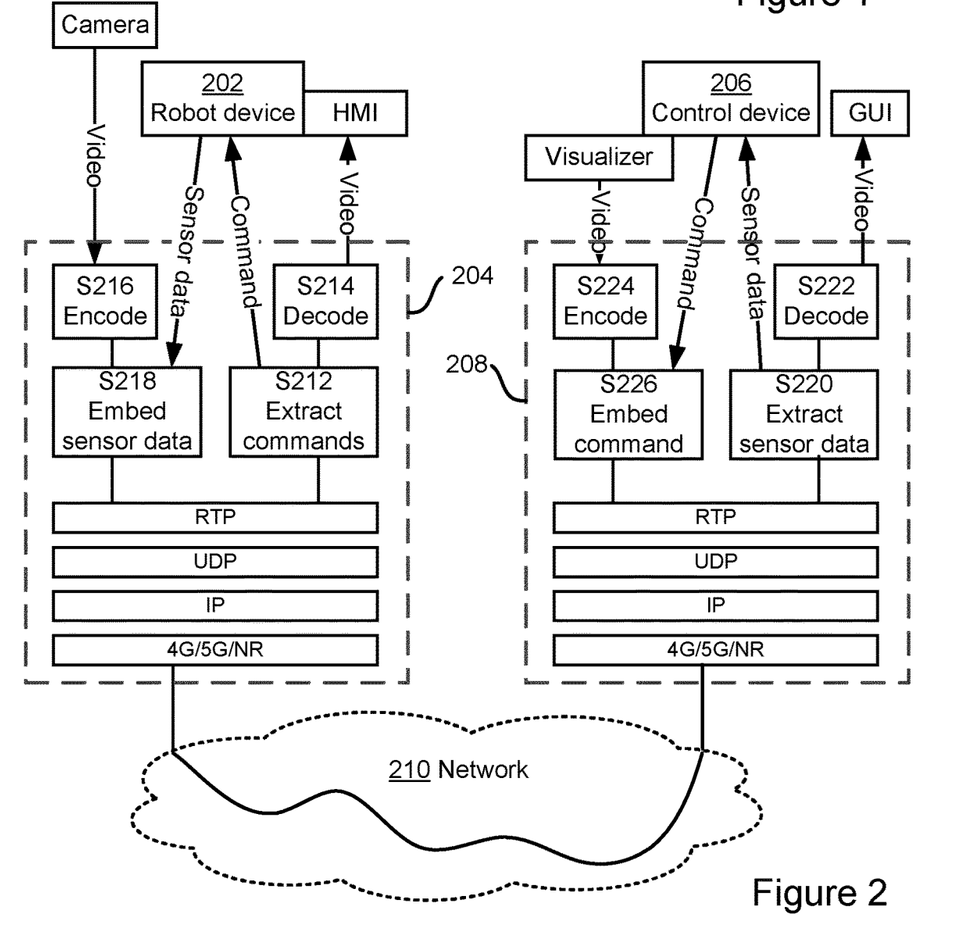
FIG. 2 schematically presents an embodiment of an architecture adapted for controlling a robot device, according to the present disclosure.

FIG. 2 schematically presents an embodiment of an architecture adapted for controlling a robot device 202 by a control device 206 within a video session over a radio communication network 210, according to the present disclosure. This architecture also comprises an execution logic 204 located down-streams the radio communication network 210. In addition, the architecture also comprises an execution logic 208 up-streams said radio communication network 210.

It is noted that execution logic 204 may reside internal or external to the robot device 202. Similarly, the execution logic may reside internal or external to the control device 206.

Controlling of the robot device 202 utilizes a control-loop of the control device 206. Based on sensor data as provided from the robot device, which sensor data is provided to the control device 206, control commands are determined. These control commands are then provided to the robot device 202, based on which sensor data of the robot device 202 is provided and delivered to the control device 206.

Content of the control commands and the sensor data used in the control-loop may depend on the type of robot control. In case of velocity control, the control commands may contain velocity values for servo motors of the robot device. The control-loop may then use joint position values, as sensor data, provided by sensors. In case of force control, the control commands may contain force values, and sensor data in the form of values from torque sensors may the used in the control-loop of the controlling.

The present disclosure utilizes a video streaming architecture in a two-way video session between the robot device 202 and a control device 206. As mentioned above, it has been realized that 4G, 5G or NR mobile communication systems offer a QoS that is adequate for robot control over the cloud. In order words, the QoS provided using such mobile communication systems fulfils robot control QoS requirements in terms of latency and robustness. For instance, ViLTE service may be advantageously used. Moreover, efficient video coding, such as H.264, may moreover be preferably used.

The two-way video session between the robot device and the control device comprises an up-stream video stream, from the robot device 202 to the control device 206, and a down-stream video stream, from the control device 206 to the robot device 202.

As a consequence of encoding, both the up-stream video stream and the down-stream video stream comprise video frames and information messages interleaved with one another.

Sensor data as well as control commands are embedded in the information messages, whereas video data is comprised in the video frames by encoding.

Further to FIG. 2, since the present disclosure uses a two-way video session between the robot device 202 and the control device 206 over the radio communication network 210, the two-way video session needs to be set-up prior to controlling the robot device 202 by the control device 206. As such, setting-up a two-way video session is however well-known, and will thus not be explained further herein. Having accomplished the set-up of the video session, a down-stream video stream as well as an up-stream video stream is thus created.

Now, with further reference to FIG. 2, in action S212 control commands are extracted from the down-stream video stream. These control commands are thus extracted from the information messages interleaved with video frames in the down-stream video stream. The control commands are provided to the robot device 202 to instruct the robot device whether and/or how to move. Based on these control commands, sensors at the robot device typically detect sensor data. In action S218, this sensor data is embedded in information messages interleaved between video frames in the up-stream video stream.

This up-stream video stream of the two-way video session is advantageously delivered by a video service, such as video over LTE (ViLTE) over a 4G, 5G or NR radio communication network 210 to the control device 206.

In action S220, sensor data is extracted from information messages interleaved with video frames in the up-stream video stream. The extracted sensor data is then when provided to the control device 206, to give input in terms of, for instance, position or velocity information of the robot device to the control device 206, based on which the control data is adapted to determine new or updated control commands for the robot device 202. Such updated control commands are then embedded in information messages interleaved with video frames in the up-stream video stream. This up-stream video stream comprising the control commands is then delivered over the radio communication network 210 to the robot device 202.

The up-stream video stream now comprises new and/or updated control commands to the extracted from information messages interleaved with video frames. These control commands are then extracted in a further iteration of action S212.

A control-loop is thus established between the robot device 202 and the control device 206.

It is noted the video session is set-up primarily to establish a communication channel between the robot device a 202 and the control device 206, which communication channel has a quality of service that is well suited for the control of a robot device over a radio communication network in terms of latency and robustness. Such a control will exchange control commands and sensor data.

Within a basic embodiment of the present disclosure, video data, as such, as comprised in the video frames, as comprised in both the up-stream video stream and the down-stream video stream, may even be unused.

However, as will be described, below, video data may be advantageously transmitted in both up-streams and down-streams in the video session, to enhance the robustness of the control of the robot device 202.

According to some embodiments of the disclosure, the down-stream video stream is decoded in action S214, whereby video data is obtained from the video frames interleaved with information messages, comprising control commands, in the up-stream video stream. The thus obtained video data is then provided to a human machine interface (HMI). This video data may comprise graphical presentations of detected positions or velocities, against corresponding positions or velocities as instructed by the control commands.

Also, up-stream video data may also be used. For this purpose, a camera at or near the robot device 202 may adapted to monitor positions and/or movements of the robot device, and to provide video data thereby created, to for instance, the execution logic 204. In action S216, this video data is encoded into video frames interleaved with information messages in an up-stream video stream.

In action S218, as described above, sensor data is embedded in the information messages interleaved with the video frames in the up-stream video stream. These video frames hence comprise the video data encoded into the video frames in action S216.

Moreover, the up-stream video stream comprising video frames with the created video data, and information messages comprising sensor data will arrive at the execution logic 208, after being delivered over the radio communication network 210.

As described above, in action S220, sensor data is extracted from the information messages being interleaved with video frames in the up-stream video stream. In this case, the video frames also comprise the created video data as originated from camera at or near the robot device 202.

Hence in action S222, the up-stream video stream is decoded, whereby video data from the camera, is obtained from the video frames of the up-stream video stream. The thus obtained video-data may then be provided to a graphical user interface (GUI), by the use of which the video data is graphically presented to a user.

From a visualizer at or near the control device, video data may be provided. In action S224, this video data is encoded into video frames interleaved with information messages in a down-stream video stream.

Based on the video data as presented in the GUI, possibly with user input, control commands from the control device may be determined.

In action S226, as described above, these control commands may now be embedded into information messages interleaved with video frames, which video frames now comprise the video data encoded in action S224.

Also, FIG. 2 schematically indicates layers which may be used for the communication of up-stream and down-stream video streams. These layers comprise real-time transportation protocol (RTP), user datagram protocol (UDP), internet protocol (IP). The RTP is a network protocol for delivering audio, video and audio and video over IP networks. The UDP is a communication protocol which in general is primarily used for establishing low latency and loss tolerating connection.

The 4G/5G/NR layer denotes the communication standards being used. A video session using a 4G/5G/NR communication standard, will have a quality of service (QoS) that is suitable for controlling a robot device from a control device over a radio communication network 210.

Figure 3:
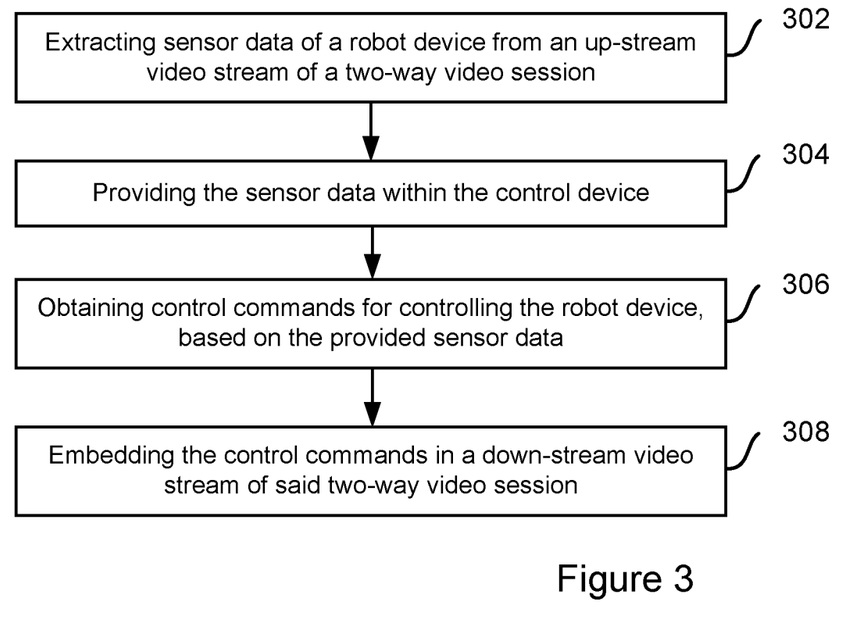
FIGS. 3 and 4 present flow charts of actions of methods according to embodiments of the present disclosure.

FIG. 3 presents a flow-chart of actions within a method of controlling a robot device 102, 202, 70 within a two-way video session between the robot device and a control device 106, 206, 60 over a mobile radio communication network 210. The method is implemented in the control device 106, 206, 60. The method comprises:

Action 302: Extracting sensor data of the robot device 102, 202, 70, from an up-stream video stream of said two-way video session.

Action 304: Providing the sensor data within the control device 106, 206, 60.

Action 306: Obtaining control commands for controlling the robot device 102, 202, 70, based on the provided sensor data.

Action 308: Embedding the control commands in a down-stream video stream of said two-way video session.

Figure 5:
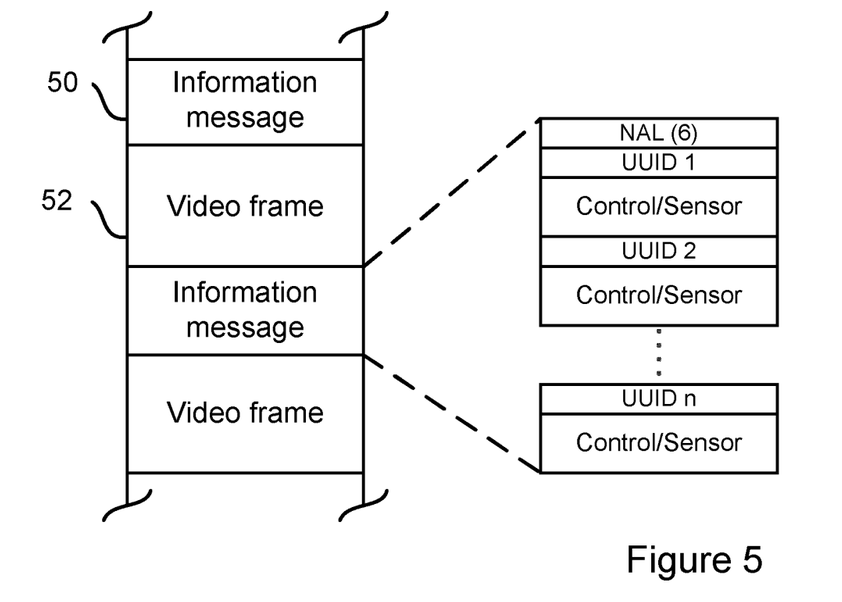
FIG. 5 presents a schematic architecture of a video stream, according to embodiments of this disclosure.

The down-stream video stream within the method may comprise down-stream video frames 52 and down-stream information messages 50 interleaved with one another, and wherein embedding the control commands may comprise embedding the control commands in the down-stream information messages.

The method may comprise providing first video data and encoding S224 said first video data whereby the down-stream video stream is created.

The up-stream video stream within the method may comprise up-stream video frames 52 and up-stream information messages 50 interleaved with one another, and wherein extracting sensor data from the up-stream video stream may comprise extracting sensor data from the up-stream information messages.

The method may further comprise decoding S222 the up-stream video stream whereby up-stream video data is obtained, and providing the up-stream video data to a user interface at the control device.

When the up-stream video data comprises camera pictures of movements of the robot device, said up-stream video data as comprised in the up-stream video frames 52 and the sensor data as comprised in the up-stream information messages 50, may be delivered in one and the same video session.

The mobile radio communication network 210 may comprises a 4G, 5G, or new radio (NR) communication network.

Within the method, the video session may use a video service over the mobile radio communication network. The video service may comprise video over long term evolution (ViLTE).

Figure 4:
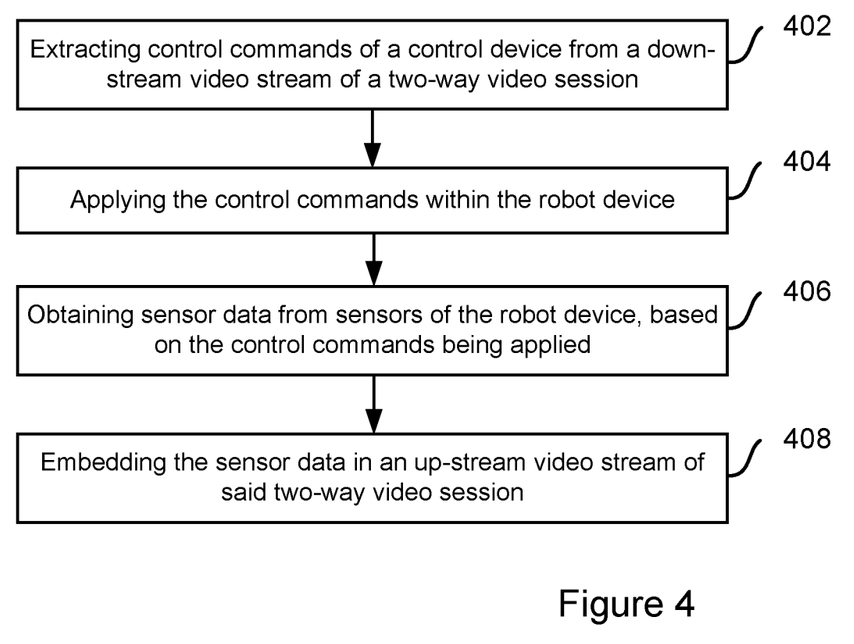

FIG. 4 presents a flow-chart of actions within a method of controlling a robot device 102, 202, 70 within a two-way video session between the robot device and a control device 106, 206, 60 over a mobile radio communication network 210. The method is implemented in the robot device. The method comprises:

Action 402: Extracting control commands of the control device 106, 206, 60, from a down-stream video stream of said two-way video session.

Action 404: Applying the control commands within the robot device 102, 202, 70.

Action 406: Obtaining sensor data from sensors of the robot device 102, 202, 70, based on the control commands.

Action 408: Embedding the sensor data in an up-stream video stream of said two-way video session.

The up-stream video stream within the method may comprise up-stream video frames 52 and up-stream information messages 50 interleaved with one another, and wherein embedding S218, 408 the sensor data may comprise embedding the sensor data in the up-stream information messages.

The method may further comprise obtaining up-stream video data, and encoding S216 said up-stream video data, whereby the up-stream video stream is created.

When the up-stream video data comprises camera pictures of movements of the robot device, said up-stream video data as comprised in the up-stream video frames 52 and the sensor data as comprised in the up-stream information messages 50, may be delivered in one and the same video session.

The down-stream video stream may comprise down-stream video frames 52 and down-stream information messages 50 interleaved with one another, and wherein extracting S212, 402 control commands from the down-stream video stream may comprise extracting control commands from the down-stream information messages.

The method may further comprise decoding S214 the down-stream video stream whereby down-stream video data is obtained and providing down-stream video data to a human-machine interface (HMI) at the robot device.

The down-stream video data may comprise video data provided by the control device.

The mobile radio communication network 210 may comprises a 4G, 5G, or new radio (NR) communication network.

The video session may use a video service over the mobile radio communication network. The video service may comprise video over long term evolution (ViLTE).

FIG. 5 presents a schematic architecture of a video stream, related to embodiments of this disclosure. This schematic architecture is applicable to both the up-stream video stream as well as to the down-stream video stream. The schematic architecture comprises video frames interleaved with information messages. The video frames are typically time-interleaved with the information messages.

The video stream may comprise a H.264 video stream. It is noted that an H.264 video stream is packetized into network abstraction layer (NAL) units.

Sensor data from the robot device and control commands from the control device, may be embedded into a video stream, as NAL units containing a "User data supplemental enhancement information (SEI) message". By using NAL units of a H.264 video stream a relatively high level of QoS level of ViLTE may thus be beneficial.

It is further noted that there are different types of NAL units, comprising different data types, for instance picture parameters, sequence parameters, and video frame data. Control commands for the robot device as well as sensor data may be inserted into NAL unit type 6. The NAL unit type 6 comprises SE messages and the special SEI message type "User data" may be used to carry user defined information.

Further, a single SEI message may be transmitted interleaved between video frames. A single SEI message may comprise multiple control commands and sensor data. Each "User data" message is typically identified by a universally unique identifier (UUID). Different UUIDs may be assigned to different communication channels, control targets or sensors.

Hence, the radio communication network can transparently serve the video session using existing video service, for instance ViLTE, and corresponding quality of expectation (QoE)/QoS mechanisms. The robot device 202 may additionally use these QoE/QoS mechanisms, for instance different handling based on NAL unit type, available in under-lying video service and optimize its operation.

Figure 6:
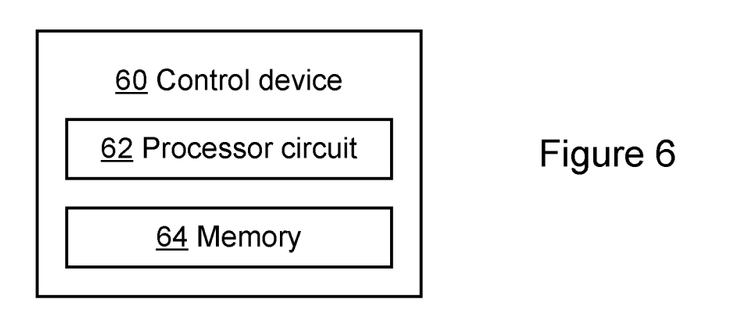
FIGS. 6 and 7 schematically present a control device and a robot device, respectively, according to embodiments of the present disclosure.

FIG. 6 schematically presents a control device 60 according to embodiments of the present disclosure. The control device 60 is configured to control a robot device 102, 202, 70 and adapted to participate in a two-way video session with the robot device over a mobile radio communication network 210. The control device 106, 206, 60 comprises a processor circuit 62, and a memory 64 that has instructions executable by the processor circuit 62. When executing said instructions, the processor circuit 62 is configured to extract sensor data of the robot device 102, 202, 70 from an up-stream video stream of said two-way video session. When executing said instructions, the processor circuit 62 is configured to provide the sensor data within the control device. Also, when executing said instructions, the processor circuit 62 is configured to obtain control commands for controlling the robot device 102, 202, 70, based on the provided sensor data. In addition, when executing said instructions, the processor circuit 62 is configured to embed the control commands in a down-stream video stream of said two-way video session.

Figure 7:
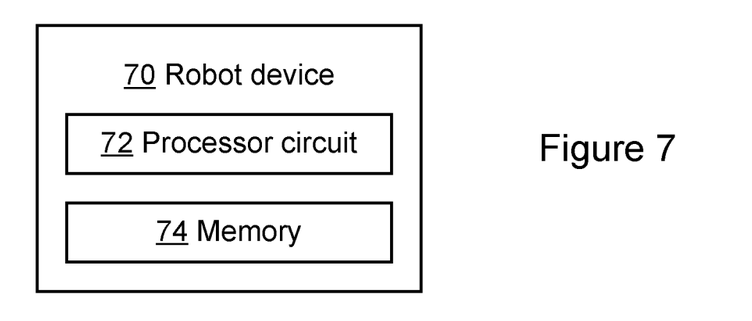

FIG. 7 schematically presents a robot device 70 according to embodiments of the present disclosure. The robot device 70 is configured to be controlled by a control device 106, 206, 60 within a two-way video session with the control device 106, 206, 60 over a mobile radio communication network 210. The robot device comprises a processor circuit 72, and a memory 74 that has instructions executable by the processor circuit 72. When executing said instructions said processor circuit 72 is configured to extract control commands from a down-stream video stream of said two-way video session. Also, when executing said instructions said processor circuit 72 is configured to apply the control commands within the robot device 70. Also, when executing said instructions said processor circuit 72 is configured to obtain sensor data from sensors of the robot device 70, based on the control commands. In addition, when executing said instructions said processor circuit 72 is configured to embed the sensor data in an up-stream video stream of said two-way video session.

The present disclosure also comprises a computer program for emulating wired connectivity between two or more robot devices and a controller. The computer program comprises instructions which, when executed on at least one processor, cause the at least one processor to carry out the any one of the actions as mentioned above and/or presented in any FIG. 3 or 4.

The present disclosure also comprises a computer program that is adapted for controlling a robot device 102, 202, 70 within a two-way video session between the robot device 102, 202, 70 and a control device 106, 206, 60 over a mobile radio communication network 210. The computer program comprises instructions which, when executed on at least one processor, cause the at least one processor to carry out any one of the actions as mentioned above and/or presented in any FIG. 3 or 4.

The present disclosure also comprises a computer-readable storage medium having thereon the computer program as above.

Examples and/or embodiments of the present disclosure have one or more of the following advantages:

It is an advantage that encodings, such as H.264 encoding, and ViLTE is an already introduced service with dedicated QoS bearer in the mobile networks for real time communication. For this reason the H.264 encoding can provide the relatively high QoS for robot control. It is a further advantage that there is no need to modify or handle specially anything in such currently deployed systems.

The present disclosure increases reliability of control of a robot device by using differentiation of control commands.

Further, as a consequence of reliability and redundancy provided by the higher QoS of the video session, retransmission of lost or damaged control commands can be avoided, which makes the control of robot devices extremely fast, truly real-time.

It is also an advantage that the up-stream video stream can be used to transmit video information on the current status of a remote robot device. It is a further advantage that the down-stream video stream can be used to transmit a graphical model of the predicted movements of the robot device.

ABBREVIATIONS 3D three-dimensional
4G 4$^{th}$ generation mobile communication
5G 5$^{th}$ generation mobile communication
GUI graphical user interface
HMI human-machine interface
Hz Hertz
IaaS infrastructure as a service
IP Internet protocol
LTE long term evolution
Mbps Mega bit per second
NAL network abstraction layer
NR new radio
QoE quality of expectation
QoS quality of service
PaaS platform as a service
RAaaS robotics and automation as a service
RTP real-time transmission protocol
SaaS software as a service
SEI supplemental enhancement information
TCP transmission control protocol
UDP user datagram protocol
ViLTE video over LTE

The invention claimed is:

1. A method of controlling a robot device within a two-way video session between the robot device and a control device over a mobile radio communication network, the method being implemented in the control device, the method comprising:
    extracting sensor data of the robot device, from an up-stream video stream of said two-way video session, wherein the up-stream video stream comprises up-stream video frames and up-stream information messages interleaved with one another, and wherein extracting sensor data from the up-stream video stream comprises extracting sensor data from the up-stream information messages, and wherein the sensor data is embedded into the up-stream video stream, as network abstraction layer (NAL) units containing a user data supplemental enhancement information (SEI) message;
    providing the sensor data within the control device;
    determining control commands for controlling the robot device, based on the provided sensor data, wherein the up-stream video stream is packetized into the NAL units, wherein different NAL unit types contain different data types, wherein the different data types comprises at least one of sequence parameters, picture parameters, or video frame data, wherein the control commands for controlling the robot device are embedded into a first NAL unit type out of the different NAL unit types, and wherein the first NAL unit type contains the user data SEI message; and
    embedding the control commands in a down-stream video stream of said two-way video session, wherein embedding the control commands for controlling the robot device into the up-stream video stream enables video communication between multiple remote sites while sending the control commands for controlling the robot device and the sensor data.

2. The method according to claim 1, wherein the down-stream video stream comprises down-stream video frames and down-stream information messages interleaved with one another, and wherein embedding the control commands comprises embedding the control commands in the down-stream information messages.

3. The method according to claim 1, further comprising:
    providing first video data; and
    encoding said first video data whereby the down-stream video stream is created.

4. The method according to claim 1, further comprising:
    decoding the up-stream video stream whereby up-stream video data is obtained, and
    providing the up-stream video data to a user interface at the control device.

5. The method according to claim 4, wherein when the up-stream video data comprises camera pictures of movements of the robot device, said up-stream video data as comprised in the up-stream video frames and the sensor data as comprised in the up-stream information messages, are delivered in one and the same video session.

6. The method according to claim 1, wherein the mobile radio communication network comprises a 4G, 5G, or new radio (NR) communication network.

7. The method according to claim 1, wherein the video session uses a video service over the mobile radio communication network.

8. The method according to claim 7, wherein the video service comprises video over long term evolution (ViLTE).

9. A control device configured to control a robot device and adapted to participate in a two-way video session with the control device over a mobile radio communication network, the control device comprising:
    a processor circuit; and
    a memory having instructions executable by the processor circuit, wherein said processor circuit when executing said instructions is configured to:
    extract sensor data of the robot device from an up-stream video stream of said two-way video session, wherein the up-stream video stream comprises up-stream video frames and up-stream information messages interleaved with one another, and wherein extracting sensor data from the up-stream video stream comprises extracting sensor data from the up-stream information messages, and wherein the sensor data is embedded into the up-stream video stream, as network abstraction layer (NAL) units containing a user data supplemental enhancement information (SEI) message;
    provide the sensor data within the control device;
    determine control commands for controlling the robot device, based on the provided sensor data, wherein the up-stream video stream is packetized into the NAL units, wherein different NAL unit types contain different data types, wherein the different data types comprises at least one of sequence parameters, picture parameters, or video frame data, wherein the control commands for controlling the robot device are embedded into a first NAL unit type out of the different NAL unit types, and wherein the first NAL unit type contains the user data SEI message; and
    embed the control commands in a down-stream video stream of said two-way video session, wherein embedding the control commands for controlling the robot device into the up-stream video stream enables video communication between multiple remote sites while sending the control commands for controlling the robot device and the sensor data.

10. A method of controlling a robot device within a two-way video session between the robot device and a control device over a mobile radio communication network, the method being implemented in the robot device, the method further comprising:
    extracting control commands of the control device, from a down-stream video stream of said two-way video session, wherein the down-stream video stream is packetized into network abstraction layer (NAL) units, wherein different NAL unit types contain different data types, wherein the different data types comprises at least one of sequence parameters, picture parameters, or video frame data, wherein the control commands are embedded into a first NAL unit type out of the different NAL unit types, wherein the first NAL unit type contains a user data supplemental enhancement information (SEI) message, wherein the down-stream video stream comprises down-stream video frames and down-stream information messages interleaved with one another, and wherein extracting control commands from the down-stream video stream comprises extracting control commands from the down-stream information messages;

applying the control commands within the robot device;

obtaining sensor data from sensors of the robot device, based on the control commands, wherein the sensor data is embedded into the down-stream video stream, as the NAL units containing the user data SEI message; and embedding the sensor data in an up-stream video stream of said two-way video session, wherein embedding the control commands for controlling the robot device into the down-stream video stream enables video communication between multiple remote sites while sending the control commands for controlling the robot device and the sensor data.

11. The method according to claim 10, wherein the up-stream video stream comprises up-stream video frames and up-stream information messages interleaved with one another, and wherein embedding the sensor data comprises embedding the sensor data in the up-stream information messages.

12. The method according to claim 11, further comprising:

obtaining up-stream video data; and encoding said up-stream video data, whereby the up-stream video stream is created.

13. The method according to claim 12, wherein when the up-stream video data comprises camera pictures of movements of the robot device, said up-stream video data as comprised in the up-stream video frames and the sensor data as comprised in the up-stream information messages, are delivered in one and the same video session.

14. The method according to claim 10, further comprising: decoding the down-stream video stream whereby down-stream video data is obtained and providing down-stream video data to a human-machine interface at the robot device.

15. The method according to claim 14, wherein the down-stream video data comprises video data provided by the control device.

16. The method according to claim 10, wherein the mobile radio communication network comprises a 4G, 5G, or new radio (NR) communication network.

17. The method according to claim 10, wherein the video session uses a video service over the mobile radio communication network and wherein the video service comprises video over long term evolution (ViLTE).

18. A robot device configured to be controlled by a control device within a two-way video session with the control device over a mobile radio communication network, the robot device comprising:

a processor circuit; and a memory having instructions executable by the processor circuit, wherein said processor circuit when executing said instructions is configured to:

extract control commands from a down-stream video stream of said two-way video session, wherein the down-stream video stream is packetized into network abstraction layer (NAL) units, wherein different NAL unit types contain different data types, wherein the different data types comprises at least one of sequence parameters, picture parameters, or video frame data, wherein the control commands are embedded into a first NAL unit type out of the different NAL unit types, wherein the first NAL unit type contains a user data supplemental enhancement information (SEI) message, wherein the down-stream video stream comprises down-stream video frames and down-stream information messages interleaved with one another, and wherein extracting control commands from the down-stream video stream comprises extracting control commands from the down-stream information messages;

apply the control commands within the robot device;

obtain sensor data from sensors of the robot device, based on the control commands, wherein the sensor data is embedded into the down-stream video stream, as the NAL units containing the user data SEI message; and embed the sensor data in an up-stream video stream of said two-way video session, wherein embedding the control commands for controlling the robot device into the down-stream video stream enables video communication between multiple remote sites while sending the control commands for controlling the robot device and the sensor data.

* * * * *